UNITED STATES PATENT OFFICE.

ERIC EDWARD DUTT, OF JABALPUR, INDIA.

PROCESS FOR THE MANUFACTURE OF POTASSIUM CHLORID.

1,332,114.    Specification of Letters Patent.    Patented Feb. 24, 1920.

No Drawing.    Application filed October 18, 1918.    Serial No. 258,710.

*To all whom it may concern:*

Be it known that I, ERIC EDWARD DUTT, a subject of the King of Great Britain, residing at Jabalpur, India, have invented a new and Improved Process for the Manufacture of Potassium Chlorid, of which the following is a full, clear, and exact description.

This invention relates to a process for the manufacture of potassium chlorid from potash feldspar (orthoclase). The object of the invention is to obtain a soluble potassium salt (namely, the chlorid) from feldspar by treating the same with arsenic trichlorid at a moderate temperature.

To obtain this the feldspar is placed into a suitable retort or muffle of suitable refractory material. The retort is provided with an inlet and an outlet tube and with means for charging and discharging the retort. The feldspar, preferably in small pieces, is maintained within the retort at a temperature of about 700 to 900° C. Arsenic trichlorid in the state of vapor is then introduced through the inlet tube which is so positioned in the retort that the arsenic trichlorid is bound to come in contact with every part of the charge. At the temperature of the retort the arsenic trichlorid reacts with the feldspar producing potassium chlorid, arsenic trioxid, aluminum silicate, and silica.

The reason why arsenic trichlorid is not added to the feldspar but introduced in the state of vapor is that it would distil off before any reaction could take place. The arsenic trioxid at the temperature of the retort is in a state of vapor and it passes off through the discharge conduit of the retort. A suitable condensing surface may be provided to condense the arsenic trioxid, which may be treated to reproduce the arsenic trichlorid necessary for the further conversion of the feldspar. The arsenic trichlorid may be prepared as described in our application of even date and relating to the process for the manufacture of alumina.

The residue left in the retort after treatment with arsenic trichlorid consists of a mixture of potassium chlorid, aluminum silicate and silica, the last two being insoluble. The residue is lixiviated with water to dissolve the potassium chlorid. The solution of potassium chlorid is decanted or filtered from the residue and evaporated to dryness. The residue will be potassium chlorid.

If the feldspar used contains a large percentage of iron oxids and the potassium salts are required to be free from iron compounds, calcium hydrate is added in sufficient quantity to the solution of potassium chlorid to precipitate any soluble iron compounds present as insoluble ferric hydrate.

I claim:

1. A process for the manufacture of potassium chlorid from feldspar which consists in treating the feldspar with arsenic trichlorid, lixiviating the so-treated mass, dissolving out the desired chlorid formed, then evaporating the solution of potassium chlorid.

2. The herein described step in a process for the manufacture of potassium chlorid from feldspar which consists in treating the feldspar with gaseous arsenic trichlorid.

ERIC EDWARD DUTT.